United States Patent
Joensen et al.

(10) Patent No.: US 8,202,413 B2
(45) Date of Patent: Jun. 19, 2012

(54) PROCESS TO CONVERSION OF OXYGENATES TO GASOLINE

(75) Inventors: Finn Joensen, Hørsholm (DK); Bodil Voss, Virum (DK); Niels Christian Schiødt, Brønshøj (DK)

(73) Assignee: Haldor Topsoe A/S, Lyngby (DK)

( * ) Notice: Subject to any disclaimer, the term of this patent is extended or adjusted under 35 U.S.C. 154(b) by 697 days.

(21) Appl. No.: 12/209,499

(22) Filed: Sep. 12, 2008

(65) Prior Publication Data

US 2009/0071871 A1 Mar. 19, 2009

(30) Foreign Application Priority Data

Sep. 14, 2007 (DK) .................................. 2007 01327

(51) Int. Cl.
*C10G 35/04* (2006.01)
*C07C 1/06* (2006.01)

(52) U.S. Cl. ......... 208/134; 208/141; 585/639; 585/640

(58) Field of Classification Search ............... 208/62–24, 208/66, 133, 134, 141; 585/310, 639, 640
See application file for complete search history.

(56) References Cited

U.S. PATENT DOCUMENTS

| 3,931,349 A | 1/1976 | Kuo |
| 4,481,305 A | 11/1984 | Jorn et al. |
| 4,520,216 A * | 5/1985 | Skov et al. ............... 585/315 |
| 2004/0129605 A1 * | 7/2004 | Goldstein et al. ........... 208/134 |
| 2005/0229491 A1 * | 10/2005 | Loffler ........... 48/198.7 |

FOREIGN PATENT DOCUMENTS

| CN | 1086533 A | 5/1994 |
| WO | WO 2007/020068 A1 | 2/2007 |

OTHER PUBLICATIONS

H. Schulz et al., "Deactivation of HZSM5 Zeolite During Methanol Conversion: Kinetic Probing of Pore Architecture and Acidic Properties", *Catalyst Deactivation*, pp. 783-790, 1991.

* cited by examiner

*Primary Examiner* — Walter D Griffin
*Assistant Examiner* — Renee E Robinson
(74) *Attorney, Agent, or Firm* — Dickstein Shapiro LLP

(57) ABSTRACT

A process for the preparation of hydrocarbon products including the steps of (a) providing a stream containing oxygenates; (b) mixing the stream with a recycle stream to form a gasoline feed stream; (c) contacting the gasoline feed stream with one or more gasoline synthesis catalysts to obtain an effluent stream with higher hydrocarbons boiling in the gasoline range; (d) withdrawing from step (c) the effluent stream; and (e) splitting a part of the effluent stream to form the recycle stream which is optionally further reduced in content of water or enriched in hydrogen, then pressurized and recycled to step (b).

6 Claims, 2 Drawing Sheets

Figure 3:
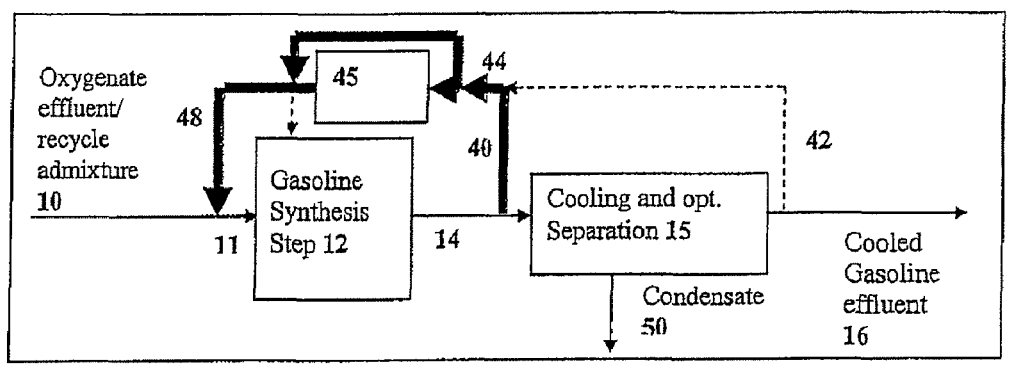

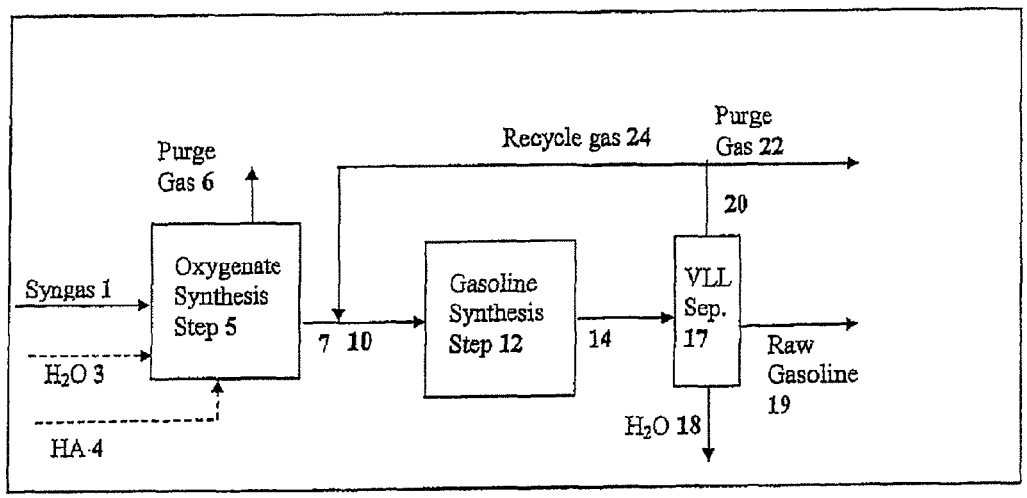
Fig 1    PRIOR ART
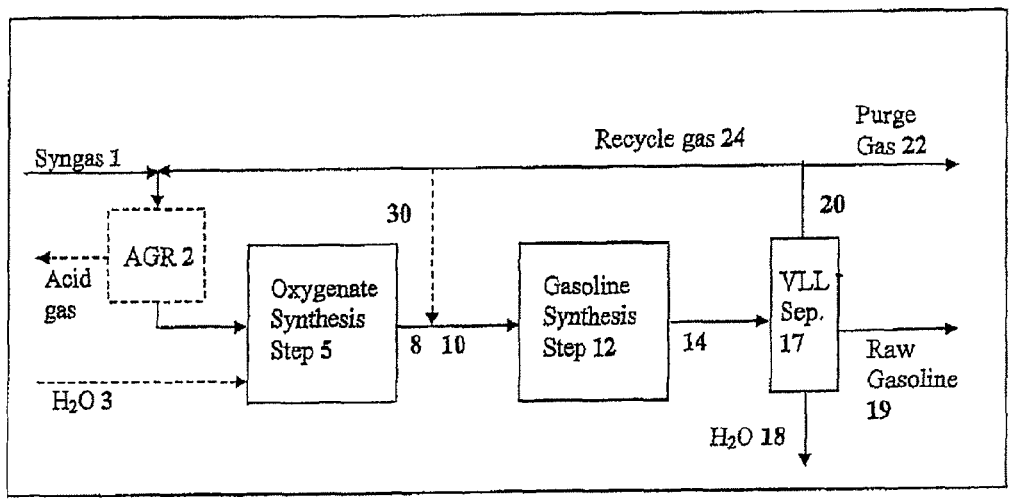
Fig 2    PRIOR ART

PROCESS TO CONVERSION OF OXYGENATES TO GASOLINE

This invention relates to an improved process of converting a stream comprising oxygenates and water to obtain a product of hydrocarbons useful as gasoline.

It has been known for several decades how to produce high value gasoline products from synthesis gas. The known synthesis process comprises the steps of (1) synthesis of oxygenates from synthesis gas, the oxygenates comprising components such as methanol, dimethyl ether, ethanol, propanol, butanol, other higher alcohols and their ethers, and (2) synthesis of gasoline product from oxygenates.

The process may either take place in two individual conversion steps, i.e. a two-step synthesis process, where basically only the oxygenate product from the first step, the oxygenate synthesis step, is fed to the second step, a gasoline synthesis step; or it may take place in an integrated synthesis layout, where the entire product including unconverted reactants comprising synthesis gas is passed from the oxygenate synthesis step to the gasoline synthesis step followed by cooling and separation of a raw product stream of hydrocarbons.

In the integrated synthesis process, a portion of the unconverted synthesis gas from the downstream separation of hydrocarbon product is recycled to the oxygenate synthesis step in order to increase the conversion of synthesis gas and to provide cooling of the exothermic reactions taking place.

The raw hydrocarbon product is typically separated from either synthesis process by cooling and condensation. The raw hydrocarbon product is then subjected to further purification, where the main fraction of the lower alkanes having four or less carbon atoms in the molecular formula ($C_{4-}$) are separated from the desired higher boiling gasoline compounds having five or more carbon atoms in the molecular formula to obtain a useful gasoline product.

The feed to the synthesis processes is synthesis gas which may be produced from various hydrocarbon sources by conventional reforming and gasification technologies, e.g. coal gasification.

In the gasoline synthesis step oxygenates are converted in a highly exothermic reaction to hydrocarbons and water. The primary fraction of hydrocarbons has a boiling range characteristic of that of gasoline. The gasoline fraction comprises normal and branched hydrocarbons, olefins, naphthenes and mononuclear aromatics. Furthermore, lower boiling hydrocarbons inclusive alkanes and light olefins are by-produced of which especially propane and butanes represent valuable co-products. Also minor amounts of ethane, methane, hydrogen and carbon monoxide are produced as by-products.

The oxygenate conversion to gasoline may take place in one or more reactors arranged in series and/or parallel. The admixed final effluent is literally free of oxygenates.

The overall reaction scheme may be specified as:

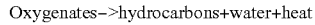

Oxygenates->hydrocarbons+water+heat

The catalysts employed for the conversion of oxygenates to gasoline are usually selected from zeolites. Preferred are zeolites with a silica to alumina mole ratio of at least 12 and pore sizes formed by up to 12 membered rings, preferably 10 membered rings. Examples of such zeolites are ZSM-5, ZSM-11, ZSM-12, ZSM-23, ZSM-35 and ZSM-38. The manufacture of these zeolites is well known. Commercial catalysts are also available. Particularly preferred is ZSM-5 in its hydrogen form, i.e. HZSM-5. Other aluminosilicates are also known to convert oxygenates to gasoline compounds.

Operating pressures in integrated gasoline synthesis processes range from 25-150 bar and preferably from 30 to 70 bar. In the two-step synthesis, the preferred operation pressure is from 5-50 bar.

The yield of gasoline compounds from the conversion of oxygenates depends i.a. on the operating temperature. Furthermore, effective conversion of oxygenates using zeolite catalysts requires a certain minimum temperature depending on the type of zeolite applied. Typical operation temperatures are 250-500° C., preferably about 300-450° C. The most preferable operation temperature when using HZSM-5 based catalysts for the conversion of oxygenates to hydrocarbons is 350-420° C. Increasing the operation temperature above the typical temperatures has an adverse effect on the yield of hydrocarbons useful as gasoline constituents.

The oxygenates being fed to the gasoline synthesis step are contained in a stream balanced by a carrier gas. In the integrated synthesis process the carrier gas may contain considerable amounts of synthesis gas components such as hydrogen, carbon monoxide, carbon dioxide and inerts together with by-products such as lower hydrocarbons ($C_{4-}$), whereas in the two-step synthesis process the carrier gas mainly consists of lower hydrocarbons by-products.

In an adiabatic reactor a high gasoline yield is only obtained when the oxygenates are substantially diluted in a carrier gas before being fed to the gasoline reaction step. The appropriate concentration, typically 3-10%, may be predetermined on the basis of the allowed temperature rise with the actual oxygenate components in their molar representation and the resulting product distribution for a given catalyst by means of commercially available simulation tools.

The resulting product distribution from a conversion of oxygenate to hydrocarbons comprises more than 50 components and the yield of gasoline products and its distribution is related to operating conditions and composition of the reaction medium. However, the gasoline yield is adversely affected by an increase in operation temperature as mentioned earlier.

Thus, a main problem connected to the conversion of oxygenates to gasoline concerns heat management and thus avoidance of an increase in operation temperatures above maximum temperatures.

Characteristics of the zeolite catalysts and related gasoline catalysts as described above are that two distinct types of deactivation take place.

One type of deactivation relates to the reversible catalytic carbonaceous deposits, generally referred to as coke, generated during normal operation on the surface of the catalyst which eventually renders the catalyst inactive in hydrocarbon formation. The coke is removed from the catalyst after the required catalyst cycle time (period of operation) in a regeneration procedure.

It is commonly recognised that high temperatures (above 400-425° C.) accelerate the formation of coke which deactivates the catalyst (H. Schulz et al, "Deactivation of HZSM5 zeolite during methanol conversion: kinetic probing of pore architecture and acidic properties", Catalyst Deactivation 1991, Elsevier, page 783), while moderate concentrations of water retards the coking rate, prolonging the cycle time (Eric J. Munson et al, 'In Situ Solid-state NMR Study of Methanol-to-Gasoline Chemistry in Zeolite HZSM-5', J. Phys. Chem. 1992, 96, page 7740-7746).

It has also been reported that the hydrogen partial pressure of the carrier gas has a retarding effect on the coking rate (Bauer et al, J. Catal. Vol 164, page 146, 1996; L. Fang et al, J. Catal. Vol 185, page 33-42, 1999). Apart from deactivating the catalyst coke also represents loss of carbon potential and thus lower yield.

The coke formation rate depends on the zeolite being applied, the feed components and on the operating conditions in particular the temperature.

Another particular parameter of concern is the content of aromatics in the feed stream. Aromatics are widely considered to be coke precursors. It has been disclosed that the coke substances found on the surface of zeolite catalysts and in their internal pore systems are of alkyl aromatic and polycyclic aromatic nature as stated by for instance of Ajit Pradhan et al (J. of Catalysis 184, 29-38 (1999)) and Sung-Jeng Jong et al (J. of Catalysis 174, page 210-218 (1998)). Others incline towards coke substances that are polyolefinic and small aromatics (Catalysis Today, vol. 33, (1997) page 353-360; Microporous and Mesoporous Materials, Elsevier, vol. 39 (2000) page 275-280).

However, not fully elucidated the origin and nature of coke is potentially a focal issue, where the level of the aromatics in the reaction medium may be of particular relevance.

The catalyst cycle time is defined as the length of the period during which the catalyst exhibits proper catalytic activity. When deactivation takes place the reaction zone is narrowed. It is important to avoid a breakthrough of oxygenates, as content of oxygenates would complicate the separation step for obtaining the final gasoline product. After such a cycle time the catalyst must be regenerated by burning off the coke or by means of a suitable redox process. It is an advantage if the catalyst can be regenerated in the reactor as used under normal operation without unloading/reloading.

Short catalyst cycle time means that an expensive type of reactor must be employed e.g. with continuous regeneration of catalyst circulated between reactor and regenerator, or that several reactors in parallel must be employed with frequent shift in operation mode (synthesis or regeneration) and equipped with complex control. An increased catalyst cycle time benefits the process by a reduction in investment and improved process efficiency.

The other type of deactivation concerns the irreversible dealumination of the zeolite framework accelerated by high water partial pressure and high temperature, which ultimately requires that the catalyst must be replaced.

Thus, both the heat management and the water partial pressure are of concern to both reversible and irreversible deactivation.

U.S. Pat. No. 4,481,305 relating to an integrated gasoline synthesis discloses a solution to the heat management problem comprising adjusting a so called inner gas recycle so as to limit the temperature increase over the gasoline synthesis step individually set by the catalyst applied. The inner (as well as the conventional outer) recycle described in U.S. Pat. No. 4,481,305 is a recycle stream of unconverted synthesis gas and/or inerts after cooling and gasoline separation. The inner recycle is recycled back to the gasoline synthesis step, as opposed to the outer recycle which is recycled back to the oxygenate synthesis step. The cooling temperature before separation is the temperature level featured by cooling water or chilling, i.e. typically from 5-50° C. The adjustment of recycle in turn influences the feed composition.

An increased gas recycle leads to increased requirements to heat transfer areas in the respective trains of heating and cooling the gas between the steps of conversion and the step of separation.

Other conventional means of adjusting the feed composition comprise changing the operating temperature of the oxygenate synthesis, the pressure or the amount of water added to the process in the oxygenate step in an integrated gasoline process.

A minimum inlet temperature must also be observed since it is a characteristic of zeolites that below a lower temperature level the conversion rate towards useful components is prohibitively low.

Catalytic reactors applied for this service must thus comply with the requirements to heat management otherwise the yield of gasoline products obtained from the process will be unsatisfactorily low, rendering the process economically unattractive.

At the same time the reactor should be able to withstand the operating conditions during regeneration of the catalyst installed inside.

Fluidised bed reactors clearly meet the requirements to heat management, as the feed temperature may be adjusted such that the exit temperature does not exceed the maximum temperature limit. This type of reactor, apart from being complex and expensive, requires a catalyst with high mechanical strength.

Cooled reactors may be used with a limitation relating to the mechanical stability of construction during the operation cycles shifting from normal operation to regeneration and back. Cooled reactors are typically operated with a boiling medium that is in heat conduction relationship with the catalyst bed, thereby removing reaction heat from an exothermic reaction zone. The preferred boiling medium is water, as water is chemically stable. Most often the steam generated by the removal of heat may be used for utilities directly.

On the other hand, due to practical limitations to pressure, boiling water temperatures above 325° C. are rarely seen.

A simple mechanical layout of cooled reactors is beneficial for the mechanical stability during the operation/-regeneration cycle if at all possible without unloading the catalyst.

Adiabatic reactors are easily applicable for catalyst regeneration in turn with normal operation without the risk of mechanical wear. In addition adiabatic reactors are the preferred choice wherever applicable, because they are cheaper than any other type of reactor.

However, adiabatic reactors are without internal heat removal and, as previously mentioned, the heat evolved must be controlled by adjusting the feed composition properly. In both the integrated and 2-step syntheses the recycle gas is obtained as the non-condensible fraction of the gasoline reactor effluent subsequent to the cooling, condensation and separation steps providing a liquid hydrocarbon fraction, a aqueous fraction and the said non-condensible gaseous fraction made up of primarily lower hydrocarbons, inerts, hydrogen and carbon oxides or a mixture hereof.

The amount of recycle gas required to obtain the appropriate dilution of the gasoline reactor feed is significant: In the two-step process featuring a makeup feed of methanol only, a methanol/water mixture (crude methanol), optionally equilibrated with respect to the methanol-dimethyl ether equilibrium, a recycle gas flow close to ten times the volumetric flow of oxygenate must be applied representing a significant parasitic loss and investment-wise incurs additional costs to heat exchangers, which heat/cool the circulating gas several hundred degrees Celsius per cycle. However, also in the integrated process it may be necessary to dilute the oxygenate feed by recycling unconverted synthesis gas (beyond the recycle rate dictated by the required degree of synthesis gas conversion to oxygenate) in order to limit the temperature increase in the adiabatic gasoline reactor.

Regarding the entire integrated synthesis process the recycle gas flow rate comparable is the total of the inner and outer recycles as defined above, which allows for optimal conversion of synthesis gas to oxygenates in the oxygenate synthesis step and secure an operating temperature of the (adiabatic or the cooled) gasoline reactor/s within the temperature range as defined by the lower temperature and the upper temperature limits. Minimising the inner and outer recycle gas flow rate in the gasoline process will improve the process economics through reduction of equipment dimension and in the cost of utilities when operating the process.

Thus, it would be desirable to enable control of the gasoline reactor temperature level whilst limiting the energy loss in the cool/re-heat cycles also saving capital cost by reducing the size of equipment relating to the cool/re-heat operations and at the same time improve the gasoline product quality.

It is therefore an objective of the invention to provide a method for converting oxygenate compounds to improved gasoline products in high yield at reduced energy loss and reduced equipment size relating to gasoline reactor recycle operations.

It is furthermore the general objective of the present invention to provide a process having operating conditions favourable to the catalyst converting the oxygenate compounds to gasoline products.

SUMMARY OF THE INVENTION

It has been found that a synergistic effect arises when recycling a predetermined amount of the hot effluent being withdrawn from the gasoline synthesis step in one or more recycle streams directly and without a low temperature separation step from one or more gasoline reactors to the feed side of the one or more gasoline reactors. Thereby, the desired dilution of the gasoline reactor feed gas is achieved in a more efficient manner, because recycle gas is not subjected to cooling to near-ambient temperature and subsequent re-heating to near the inlet temperature of the gasoline reactor. Furthermore, advantageously the gasoline product obtained from the process by introducing such a recycle obtains a higher average C-number.

Optionally, the hot effluent may be subjected to water removal in order to reduce the water concentration before being passed to the feed side of the gasoline reactors. Thereby, the water content in the feed to the gasoline synthesis step is limited, which reduces the rate of dealumination of zeolite gasoline synthesis catalysts.

Thus, this invention provides in its broadest embodiment a process for the preparation of hydrocarbon products, comprising the steps of
(a) providing a stream containing oxygenates;
(b) mixing the said stream with a recycle stream to form a gasoline feed stream;
(c) contacting the gasoline feed stream with one or more gasoline synthesis catalysts to obtain an effluent stream comprising higher hydrocarbons boiling in the gasoline range;
(d) withdrawing from step (c) the effluent stream; and
(e) splitting a part of the effluent stream to form the recycle stream which is optionally further reduced in content of water or enriched in hydrogen, then pressurised and recycled to step (b).

The hot effluent from the gasoline synthesis reactor may be partly cooled by conventional means to temperatures above typical cooling water temperature levels i.e. above 50° C. before being recycled, which may serve for adjustment of the temperature of the resulting admixed feed. If condensed water is separated from the hot effluent recycle, it may further serve for the adjustment of the water content in the hot effluent recycle.

Recycling the hot effluent stream to the feed side of the gasoline reactors involves an increase in concentration of condensible compounds in the inlet zone of the gasoline reactors. Condensible compounds are mainly $C_{5+}$ including aromatics and $C_{4-}$ hydrocarbons and water.

Potentially, the increased level of aromatics could lead to the increased coke formation as aromatics are generally believed to be precursors for coke formation as already mentioned. It has, however, been found that the addition of the highly substituted aromatic component such as trimethyl benzene to a feed gas containing oxygenates does not lead to a reduced life time of the gasoline synthesis catalyst run at controlled conditions. Neither does the presence of paraffins, olefins or naphthenes have negative effects on catalyst cycle time. Rather, the effect obtained with an increased level of hydrocarbons provided in the hot recycle stream is that of increasing the average carbon number of the hydrocarbon product thereby lowering the volatility of the hydrocarbon product and increasing gasoline yields.

Thus, a key advantage of the invention is that the gasoline product distribution obtained from the conversion of the oxygenate feed using zeolite catalyst is more attractive.

Apart from providing a higher level of hydrocarbons at the inlet of the gasoline reactor the hot recycle also contains water formed by the formation of hydrocarbons from oxygenates. It may, therefore, be desirable to reduce the water content in the hot recycle stream.

One way to reduce the water level in the hot recycle stream is to use at least as part of the recycle a recycle stream, wherein the water content has been reduced, e.g. by cooling the recycle stream to below the dew point with respect to water thereby reducing the water content.

Alternatively, the water content in the recycle stream may be reduced by adding a process step comprising any conventional method of reducing the water content in a process stream. The recycle stream comprises in addition to hydrocarbons gaseous components such as hydrogen, carbon oxides and nitrogen. If the recycle stream contains excess carbon monoxide with respect to the water gas shift (WGS) reaction the water content may beneficially be reduced by subjecting the recycle stream to a catalyst active in the WGS reaction:

$$H_2O + CO \leftrightarrow H_2 + CO_2$$

Preferred catalysts for the WGS step are those with a low selectivity toward hydrogenation of olefins, especially lower olefins like C2 to C4 olefins, which upon hydrogenation are rendered essentially unreactive with respect to forming higher hydrocarbons, thereby reducing the gasoline productivity. Many WGS catalysts also catalyze the formation of methanol which in the present context is even desirable, because it increases the synthesis gas conversion. The selectivity to oxygenate compounds is of less importance and may obviously even be desirable. Suitable catalysts for the WGS reaction in the process of the invention are those of the Zn/Cr oxide type. Examples of such catalysts are the SMK and SMKR catalysts (supplied by Haldor Topsøe A/S, Denmark) and the ICI 26-1 catalyst.

An additional advantage by subjecting the hot recycle stream to a WGS step is that the recycle stream becomes enriched in hydrogen which, as mentioned above, is known to reduce the coking rate of zeolite catalysts. Thus, the inclusion of a WGS step in the process is effective in hydrogen enrichment of the reaction medium in the gasoline reactor and reduces the deactivation rate of the zeolite catalyst.

Furthermore, the enrichment of the recycle stream in hydrogen and $CO_2$ means that in a process scheme, where the gasoline and hydrocarbon products are separated from the inerts and optionally unconverted synthesis gas, at least a portion of thus treated stream being enriched in hydrogen may be employed either for the hydrogenation of olefins over the fence hydrotreating plants or as a fuel e.g. in a gas turbine.

The feed to the two-step or integrated gasoline synthesis processes comprises synthesis gas (primarily carbon monoxide, hydrogen, carbon dioxide and minor amounts of inerts). The synthesis gas may be generated in a coal gasifier in which case it is denominated coal gas. Coal gas is rather rich in carbon monoxide and has a typical carbon monoxide to hydrogen ratio of 1-2.

DETAILED DESCRIPTION OF THE INVENTION

Figure 4:
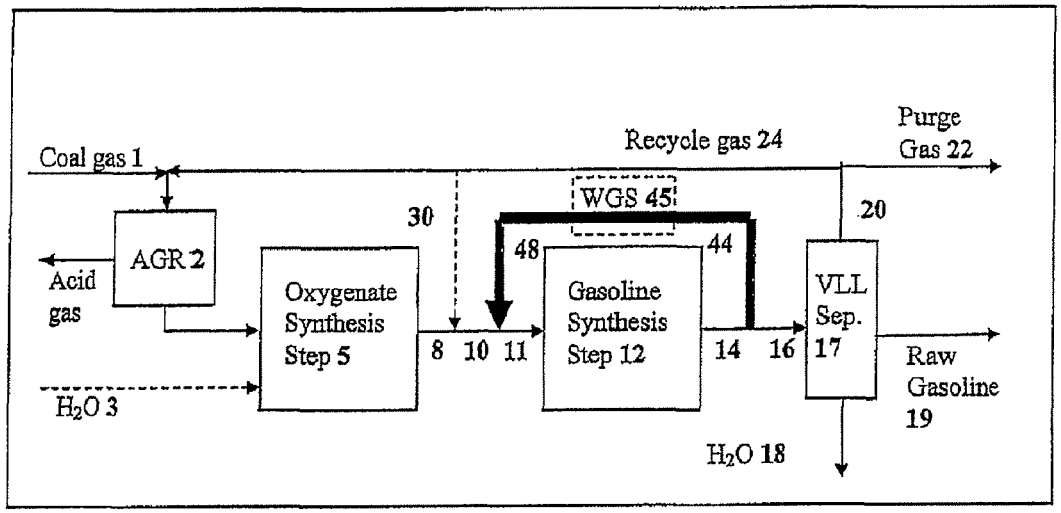

The above features and advantages of the invention will be illustrated by the following description by reference to the drawings, in which FIG. 1 shows a comparative two-step gasoline synthesis process;

FIG. 2 shows a comparative integrated gasoline synthesis process including recycle;

FIG. 3 shows key elements of the embodiments of the inventive process involving the gasoline synthesis section fed by an oxygenate containing stream provided from a two-step or an integrated gasoline synthesis process, of which examples are given in FIGS. 1 and 2; and FIG. 4 shows a basis conventional gasoline from coal gas process used in the comparative Example 1 and indicated inventive modifications hereof forming the bases used in the Examples 2 and 3 of the invention. The indicated modifications involve the inclusion of the recycle stream 44/48 (thick line) (Example 2), and further benefits may be obtained through the additional inclusion of water gas shift conversion step 45 (stippled box) (Example 3).

Referring to FIG. 1, synthesis gas 1 is fed to oxygenate synthesis step 5, where the catalytic conversion of synthesis gas to methanol, dimethyl ether and/or higher alcohols having two or more carbon atoms per molecule takes place. Optionally water 3 and/or a stream comprising higher alcohols 4 is added to oxygenate synthesis step 5. If the stream comprising higher alcohols 4 contains aldehydes, ketones or carboxylic acids, then these are beneficially converted to higher alcohols over a selected number of oxygenate catalysts. Purge gas 6 comprising unconverted synthesis gas and inerts is removed from oxygenate synthesis step 5. Effluent 7 from oxygenate synthesis step 5 contains the synthesised oxygenates raw product only (further water and dissolved gases) and it is mixed with recycle gas stream 24 and transferred as stream 10 to the gasoline synthesis step 12 as gasoline reactor feed. After conversion of oxygenates to hydrocarbons the stream leaving gasoline synthesis step 12 comprises raw gasoline product 14, which is cooled and separated in VLL separator 17. The raw gasoline product 19 is removed from the VLL separator 17 and water in line 18. The gas phase 20 from the VLL separator 17 is split into a purge gas 22 comprising lower alkanes and a remainder recycle gas stream 24, which is recycled and mixed with oxygenate effluent stream 7.

FIG. 2 shows a comparative integrated gasoline synthesis process including recycle of the cooled effluent from the gasoline synthesis reactor.

The reference numbers used in FIG. 1 are also applied in this figure. This process differs from the process described in FIG. 1 in that the entire effluent 8 from the oxygenate synthesis reactor including unconverted reactants comprising synthesis gas is passed from the oxygenate synthesis reactor to the gasoline synthesis reactor followed by cooling and separation of a raw product stream of hydrocarbons.

The effluent 8 from oxygenate synthesis reactor 5 therefore includes both oxygenates and unconverted reactants comprising synthesis gas. Effluent 8 is optionally mixed with a recycle stream 30 primarily comprising unconverted synthesis gas, inerts and $C_{4-}$ hydrocarbons and transferred in line 10 to gasoline synthesis step 12 for conversion to hydrocarbons. The effluent containing raw gasoline product 14 is then cooled and/or separated in unit 17. The raw gasoline product 19 is removed from the VLL separator 17 and water in line 18 balanced by stream 20. Stream 20 is divided into two streams, stream 22 for the purging of inert gas from the synthesis loop and recycle stream 24, which is transferred to oxygenate synthesis reactor 5 and optionally to gasoline synthesis step 12 via line 30 as mentioned.

An acid gas removal (AGR) step 2 may optionally be added for reducing the content of acid gases such as carbon dioxide in the feed to oxygenate synthesis step 5. The acid gas removal may optionally be inserted only in the part of the recycle gas stream returned to the oxygenate synthesis step (not shown).

FIG. 3 illustrates an embodiment of the invention. The effluent from the oxygenate synthesis step 7 of FIG. 1 or step 8 of FIG. 2, optionally mixed with recycle gas 30 admixture 10, is mixed with a recycle stream 48 from the effluent side of the gasoline synthesis step 12 forming an admixture 11. The gasoline synthesis step feed 11 enters gasoline synthesis step 12 for conversion. The effluent 14 from gasoline synthesis step 12 contains raw gasoline product, water and light hydrocarbon product and conditionally unconverted synthesis gas, if an integrated gasoline synthesis is applied.

The characteristic steps of the invention is that one or more recycle streams from the gasoline synthesis step effluent side are recycled and mixed with stream 10 as described above. A partial stream 40 is optionally split off from effluent 14 and is further optionally cooled/heated or processed and recycled by means of pressure increase to one or more feed points to gasoline synthesis step 12. The remainder of effluent 14 is further cooled and optionally water or water and hydrocarbons in line 50 is separated by conventional means in unit 15 securing at least a lower temperature and/or a lower water content of the effluent 16, which is thence passed to the VLL separation 17 as can be found in FIGS. 1 and 2.

A recycle stream 42 is split from the remainder of the gasoline effluent leaving a net effluent stream 16. The recycle stream 42 is further optionally cooled/heated or processed and recycled by means of pressure increase to one or more feed points to gasoline synthesis step 12. Gasoline product stream 16 comprises gasoline and lower hydrocarbons and can also contain some water which may not have been removed previously, and conditionally it may contain significant amounts of synthesis gas if an integrated gasoline synthesis is applied.

The flow rates of streams 40 and 42 may individually be 0, but the sum is positive. Advantageously, the use of a recycle from gasoline synthesis step 12 reduces the need for gas recycle 24 around the oxygenate synthesis reactor (reference is made to FIGS. 1 and 2). In some cases recycle stream 24 to the oxygenate synthesis reactor may not be needed if a sufficiently high degree of conversion of synthesis gas to oxygenates is obtained.

Recycling of partial stream 40 and recycle stream 42 may serve as means of cooling and/or feed adjustment for gasoline synthesis step 12, thereby providing an improved yield and/or a lower gasoline reactor feed rate. Gasoline synthesis step 12 may consist of one or more gasoline synthesis reactors.

Partial stream 40 and recycle stream 42 are hot recycle streams that may be individually cooled or otherwise processed for instance by conversion in water gas shift reactor 45. The water content is thus reduced. A pressure increase on the two recycle streams can be provided using compressors and ejectors (not shown). Unit 15 for cooling and/or separating cooled gasoline effluent includes conventional means such as direct/indirect cooling, phase membrane, evaporative separation and washing. The gasoline synthesis taking place in gasoline synthesis step 12 may be carried out in a conventional manner.

Recycling the hot gasoline reactor effluent (rather than the gas obtained after cooling and condensation to near-ambient temperature) provides several advantages.

A major advantage is that only a fraction of the gasoline reactor effluent needs to be cooled to near-ambient temperature (0-50° C.) reducing both the size and the duty of heat exchangers, coolers and chillers. Additionally, the amount of recycle gas that must be re-heated to levels close to the gasoline reactor inlet temperature is reduced.

An additional advantage of the hot recycle is that it increases the concentration of condensibles (hydrocarbons and water) in the gasoline reactor effluent, thereby increasing the gasoline reactor effluent dew point. When the point of condensation downstream of the gasoline reactor is reached at a higher temperature, the calorific value recovered in the condensation step is increased and may be utilised for e.g. steam generation.

Yet an additional advantage in establishing a hot recycle from the gasoline synthesis step is that the product distribution of gasoline products will be favourably shifted toward higher boiling compounds improving i.a. the vapour pressure characteristics of the final gasoline product.

Ejectors are suffering from the limitations that a large pressure drop is encountered if the suction flow rate is large as compared to the motive flow rate. In a specific embodiment of the invention the need for the gas flow rate through the gasoline synthesis step is reduced to a level where an ejector will accomplish the needs through recycle without prohibitive loss of pressure. The ejector can be placed upstream the gasoline synthesis step 12 and down-stream the oxygenate synthesis step 5.

In another specific embodiment of the invention the need for recycle of unconverted gas to the oxygenate synthesis step is avoided, which means that the allowed pressure drop only must comply with the appropriate operating pressure of the gasoline synthesis step as described.

The particular advantages by employing an ejector are that the power needed for recycling unconverted gas is reduced or eliminated and that the recycle of hot effluent (raw gasoline product) from the gasoline synthesis step serves as means of direct heating of the feed to the gasoline synthesis step.

FIG. 4 shows the basis process layouts of the coal gas to gasoline process used in Examples 1-3. For the ease of understanding the inventive modifications have been indicated by means of a thick line 44/48 and a stippled box WGS 45. Thus one embodiment (Example 1) of the process is the conventional integrated gasoline synthesis process fed with coal gas being rich in carbon monoxide and which includes as to recycle streams solely the recycle 24 of cooled (separation temperature up to 50° C.) effluent from a VLL separation unit downstream the gasoline synthesis reactor. The inventive embodiments (Examples 2 and 3) exclusively also include the recycle of hot effluent 44/48 (thick line), the advantages of which have been described above. In Example 3 is included the use of the water gas shift conversion on the hot effluent recycle (stippled box WGS 45).

Coal gas 1 is mixed with recycle gas 24 and fed to oxygenate synthesis step 5, where catalytic conversion of synthesis gas to oxygenates takes place. Prior to entering oxygenate synthesis step 5 the coal gas is subjected to an acid gas removal step 2, where acid gases such as carbon dioxide are removed. The acid gas removal may comprise the combined recycle gas and coal gas streams (as shown in FIG. 4) or it may optionally comprise only the recycle gas stream (option not shown in FIG. 4). Optionally, water in line 3 is added to oxygenate synthesis step 5. Effluent 8 is optionally mixed with recycle stream 30 and with recycle stream 48 and transferred to gasoline synthesis reactor 12 for conversion to hydrocarbons. In the cases of the inventive embodiments (Examples 2 and 3) the hot gasoline reactor effluent 14 is split into a hot recycle stream 44 and the remainder stream 16 is cooled and separated into raw gasoline product 19 water 18 and a gas phase 20 in VLL separator 17. Otherwise in the conventional embodiment (Example 1) the hot gasoline reactor effluent 14 is simply cooled before being separated into streams 18, 19 and 20 in VLL separator 17.

The hot recycle stream 44 when employed is further optionally cooled/heated and/or processed and recycled by means of pressure increase to one or more feed points to gasoline synthesis step 12 or to oxygenate effluent and recycle admixture 10. Processing of recycle stream 44 may comprise (as in Example 3) passing it to water gas shift reactor 45 to provide a recycle stream 48 reduced in water and carbon monoxide and enriched in hydrogen and carbon dioxide.

Stream 20 comprising unconverted reactants is transferred from unit 17 and recycled as recycle stream after removal of purge gas 22 to oxygenate synthesis step 5 via acid gas removal step 8. Optionally, recycle stream 30 is split from recycle stream 24 and transferred to effluent 8, which is admixed with recycle stream 48 and introduced into gasoline synthesis step 12.

EXAMPLES

Example 1 (Comparative)

This example is not an embodiment of the present invention. Reference is made to FIG. 4, where in this specific example the inventive recycle of gasoline effluent stream 44 is omitted.

Coal gas 1 with the specified composition found in Table 1 at 59.7 bar is mixed with a split stream of recycle gas 24 and passed to $CO_2$ removal unit 2. The $CO_2$ content is reduced to 0.01% in the purified coal gas. $CO_2$ is removed in order to increase the degree of conversion of synthesis gas. Water 3 is added to the integrated synthesis process in order to adjust the synthesis gas composition to the optimum required for conversion to oxygenates. In oxygenate synthesis step 5 the synthesis gas is efficiently converted to a mixture of oxygenates. Recycle stream 30 being a split stream of recycle stream 24 is mixed with effluent 8 from oxygenate synthesis step 5 being rich in oxygenates.

The composition of oxygenates contained in the admixture 10 is such (adjusted by the recycle rate in stream 30) that the gasoline synthesis may be conducted adiabatically from a temperature of 325° C. The desired yield of $C_{5+}$ components of 78% on a weight basis in the synthesis sets the maximum temperature in the gasoline synthesis at 395° C.

Table 1 shows the gas compositions obtained at the various positions:

TABLE 1

| Composition (mol %) | Stream No. | | | | | |
|---|---|---|---|---|---|---|
| | 1 | 3 | 10 | 19 | 22 | 24 |
| | Stream Description | | | | | |
| | Coal gas | Water | Gasoline synthesis feed | Gasoline product | Purge gas | Recycle gas |
| $H_2$ | 37.44 | | 17.08 | 0.77 | 17.94 | 17.94 |
| CO | 45.35 | | 17.03 | 1.91 | 17.86 | 17.86 |
| $CO_2$ | 15.93 | | 19.43 | 12.21 | 20.07 | 20.07 |
| $N_2$ | 0.60 | | 26.03 | 2.55 | 27.13 | 27.13 |
| $H_2S$ | 0.58 | | 0 | 0 | 0 | 0 |
| $H_2O$ | 0.1 | 100 | 0.11 | — | 0.1 | 0.1 |
| MeOH | 0 | | 0.28 | 0 | 0 | 0 |
| DME | 0 | | 3.75 | 0 | 0 | 0 |
| HA | 0 | | 0.1 | 0 | 0 | 0 |
| $C_{5+}$ | 0 | | 0.65 | 54.21 | 0.69 | 0.69 |
| $C_{4-}$ | 0 | | 15.54 | 28.35 | 16.21 | 16.21 |
| Flow rate, kmol/h | 1000 | 51.7 | 3398 | 57.9 | 16.7 | 3237 |

Example 2

This is an Example of the invention demonstrating the benefits obtained by including a hot effluent recycle 44 from the gasoline synthesis step. The experiment of Example 1 was repeated with the same target values on gasoline yield as specified in Example 1. Different to Example 1, a hot effluent recycle is introduced. The recycle stream 44 is cooled, compressed and forming the pressurised hot effluent 48, which is mixed with the oxygenate effluent/recycle gas admixture 10 to form stream 11, which is fed to the gasoline synthesis step 12.

Table 2 below summarizes the results being obtained by operating the process of this example:

TABLE 2

| Composition (mole %) | Position | | | | | |
|---|---|---|---|---|---|---|
| | 1 | 3 | 11 | 19 | 22 | 24 |
| | Stream description | | | | | |
| | Coal gas | Water | Gasoline synthesis feed | Gasoline product | Purge gas | Recycle gas |
| $H_2$ | 37.44 | | 13.94 | 0.74 | 16.90 | 16.90 |
| CO | 45.35 | | 15.70 | 2.05 | 18.92 | 18.92 |
| $CO_2$ | 15.93 | | 17.31 | 12.37 | 20.05 | 20.05 |
| $N_2$ | 0.60 | | 22.18 | 2.55 | 26.57 | 26.57 |
| $H_2S$ | 0.58 | | 0 | 0 | 0 | 0 |
| $H_2O$ | 0.1 | 100 | 8.84 | — | 0.1 | 0.1 |
| MeOH | 0 | | 0.29 | 0 | 0 | 0 |
| DME | 0 | | 4.25 | 0 | 0 | 0 |
| HA | 0 | | 0.1 | 0 | 0 | 0 |
| $C_{5+}$ | 0 | | 2.46 | 53.29 | 0.70 | 0.70 |
| $C_{4-}$ | 0 | | 14.93 | 29.0 | 16.76 | 16.76 |
| Flow rate, kmole/h | 1000 | 51.0 | 3013 | 57.2 | 17.1 | 850. |

It should be noted, that the component mole flow of $C_{5+}$ compounds is slightly lower as compared to Example 1. This is due to the fact that the average mole weight of the $C_{5+}$ contained in the product is increased by applying the hot effluent recycle as described earlier.

As it will be apparent from Table 2, the flow rates of recycle stream 24 is strongly reduced, but also the flow rate to the gasoline synthesis step stream 11 is reduced. This is due to the increased relative heat capacity of the feed stream, i.e. stream 4, to the gasoline synthesis step. The water level in the feed is increased from 0.11% to 8.84% reducing the tendency of reversible deactivation (coking) of the catalyst. However, such an increased water concentration may increase the tendency of irreversible deactivation (dealumination) depending on the gasoline synthesis catalyst applied and the synthesis temperature and pressure.

By way of further Example 3, it will be demonstrated how the water level can be reduced in the inlet composition to the gasoline synthesis step.

Example 3

Above Example 2 is repeated with the exception that a WGS step 45 is included in the hot effluent recycle 44/48 to the inlet of gasoline synthesis step 12. The recycle stream 44 (at 395° C.) from the gasoline effluent is passed over a WGS reactor 45 containing water gas shift catalyst converting water with carbon monoxide to form hydrogen and carbon dioxide. The pressurised effluent stream 48 is thence mixed with the oxygenate effluent/recycle admixture 10 to form the gasoline synthesis step feed 11.

The results obtained in that process layout are summarized in Table 3 below.

TABLE 3

| Composition (mole %) | Position | | | | | |
|---|---|---|---|---|---|---|
| | 1 | 3 | 11 | 19 | 22 | 24 |
| | Stream description | | | | | |
| | Coal gas | Water | Gasoline synthesis feed | Gasoline product | Purge gas | Recycle gas |
| $H_2$ | 37.44 | | 19.70 | 0.98 | 22.77 | 22.77 |
| CO | 45.35 | | 8.98 | 1.13 | 10.41 | 10.41 |
| $CO_2$ | 15.93 | | 18.30 | 12.56 | 20.27 | 20.27 |
| $N_2$ | 0.60 | | 24.95 | 2.72 | 28.58 | 28.58 |
| $H_2S$ | 0.58 | | 0 | 0 | 0 | 0 |
| $H_2O$ | 0.1 | 100 | 4.76 | — | 0.1 | 0.1 |
| MeOH | 0 | | 0.28 | 0 | 0 | 0 |
| DME | 0 | | 4.25 | 0 | 0 | 0 |
| HA | 0 | | 0.1 | 0 | 0 | 0 |
| $C_{5+}$ | 0 | | 2.62 | 53.43 | 0.65 | 0.65 |
| $C_{4-}$ | 0 | | 16.06 | 29.18 | 17.22 | 17.22 |
| Flow rate, kmole/h | 1000 | 5.0 | 3023 | 57.2 | 15.5 | 850. |

The catalysts used in the WGS step are selected from the suitable WGS catalysts as described Note that the average mole weight of the $C_{5+}$ contained in the product is increased by applying the hot effluent recycle lowering the component molar flow rate at constant $C_{5+}$ yield (weight basis).

Example 4

(a) In a baseline experiment, methanol (0.07 ml/min, liquid basis) diluted in nitrogen (100 ml/min) was continuously fed in the gas phase to a tubular reactor charged with 0.5 g of zeolite H-ZSM-5 supplied by Zeochem AG (PZ-2/100H), at an inlet temperature of 350° C. and a pressure of 15 barg. By introducing the methanol feed at a high rate (WHSV=5.7 g/g h), the cycle time, i.e. the time elapsed until coke formation on the zeolite causes hydrocarbon production to decline and eventually cease and methanol and dimethyl ether is observed in the effluent, was 68 h, ±2 h.

(b) Experiment (a) was repeated with fresh catalyst except that m-xylene and water each in an amount of 10% by weight were added to the methanol feed. Xylenes represent a significant fraction, typically 5-10 wt % of the hydrocarbon product resulting from conversion of methanol over H-ZSM-5 under typical reaction conditions. The volumetric liquid flow was increased so that the methanol feed rate was the same as in Example (a). The time elapsed until breakthrough of methanol and dimethyl ether was 82 h, ±2 h.

(c) Experiment (b) was repeated with fresh catalyst except that toluene was substituted with m-xylene. The time elapsed until breakthrough of methanol and dimethyl ether was 66 h, ±2 h.

(d) Experiment (b) was repeated with fresh catalyst except that 1,2,4-trimethylbenzene was substituted for m-xylene. The time elapsed until breakthrough of methanol and dimethyl ether was 80 h, ±2 h.

(e) Experiment (b) was repeated with fresh catalyst except that a mixture of hydrocarbons was substituted for m-xylene. The hydrocarbon mixture comprised the main constituents of a hydrocarbon product obtained by conversion of methanol over H-ZSM-5 (amounts in wt %): 2-methylbutane 15.3, 1-pentene 5.1, 2,3-dimethyl butane 0.6, 2-methylpentane 9.0, 3-methylpentane 5.8, methylcyclopentane 7.5, benzene 0.1, 2,3-dimethylpentane 3.2, methylcyclohexane 11.5, toluene 2.6, octane (isomers) 7.7, ethylcyclohexane 2.6, o-xylene 1.3, m-xylene 2.6, p-xylene 3.8, 1,3,5-trimethylbenzene 10.2, 1,2,4-trimethylbenzene 10.2, 1,2,3-trimethylbenzene 0.3, 1,2,4,5-tetramethylbenzene 6.4. No water was added to this mixture. To simulate the presence of light hydrocarbons present in the hot effluent recycle the nitrogen carrier gas was admixed to obtain 1% by volume of propene. The time elapsed until breakthrough of methanol and dimethyl ether was 84 h, ±2 h.

The results in experiments (a) through (e) demonstrate that the simultaneous feed of oxygenates (methanol) and heavy hydrocarbon product as it will result from mixing the oxygenate-containing feed stream with the hot effluent recycle from the gasoline reactor has no negative effect on the zeolite coking rate rather it was found to have a beneficial effect.

In Example 4(e) the yield of hydrocarbons having a carbon number of or above 5 was significantly improved.

It was further found that the content of aromatics, mainly tri- and tetramethylbenzenes having high octane numbers, of the hydrocarbon fraction produced was significantly higher (30-35 wt %) than the aromatic content of the other hydrocarbon products obtained (25-30 wt %). Another advantage of establishing a recycle of the hot effluent to the feed side of the gasoline reactor is therefore that the octane number of the product obtained increases.

Recycling part of the hot effluent to the feed side of the gasoline synthesis step has the further advantage that light olefins present in the recycle stream, which are reactive intermediates in the methanol feed, are returned to the gasoline reactor where they further react e.g. by alkylation by oxygenates, thereby increasing the average carbon number of the hydrocarbon product i.e. increasing the amount of higher-boiling components.

The invention claimed is:

1. A process for the preparation of hydrocarbon products, comprising the steps of:
    (a) providing a stream containing oxygenates and carbon monoxide;
    (b) mixing the stream with a recycle stream to form a gasoline feed stream;
    (c) contacting the gasoline feed stream with one or more gasoline synthesis catalysts to obtain an effluent stream comprising higher hydrocarbons boiling in the gasoline range;
    (d) withdrawing from step (c) the effluent stream; and
    (e) splitting a part of the effluent stream to form the recycle stream which is optionally further reduced in content of water or enriched in hydrogen, wherein the recycle stream is then pressurized and recycled to step (b), and wherein the recycle stream is further subjected to a water gas shift reaction prior to being introduced in step (b).

2. The process of claim 1, where the effluent from step (d) is cooled to a temperature of above 50° C. and optionally separated upstream of the splitting of the effluent.

3. The process of claim 2, wherein the separation is conducted by phase separation.

4. The process of claim 1, wherein the gasoline feed admixture is contacted with the gasoline catalyst in adiabatic manner.

5. The process of claim 1, wherein the recycle stream is pressurized by means of an ejector and the oxygenate containing stream from step (a) acts as a motive stream.

6. The process of claim 1, wherein steps (a) to (c) are carried out in presence of synthesis gas.

* * * * *